(12) United States Patent
Nishida et al.

(10) Patent No.: US 9,282,578 B2
(45) Date of Patent: *Mar. 8, 2016

(54) MOBILE COMMUNICATION METHOD, MOBILE MANAGEMENT NODE, AND SERVING GATEWAY APPARATUS

(75) Inventors: Katsutoshi Nishida, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 283 days.

This patent is subject to a terminal disclaimer.

(21) Appl. No.: 13/978,101

(22) PCT Filed: Dec. 28, 2011

(86) PCT No.: PCT/JP2011/080445
§ 371 (c)(1),
(2), (4) Date: Jul. 2, 2013

(87) PCT Pub. No.: WO2012/093639
PCT Pub. Date: Jul. 12, 2012

(65) Prior Publication Data
US 2013/0279421 A1    Oct. 24, 2013

(30) Foreign Application Priority Data

Jan. 7, 2011   (JP) ................................ 2011-002554
Apr. 7, 2011   (JP) ................................ 2011-085415

(51) Int. Cl.
*H04W 76/00*   (2009.01)
*H04W 8/30*   (2009.01)
(Continued)

(52) U.S. Cl.
CPC ................ *H04W 76/00* (2013.01); *H04W 8/30* (2013.01); *H04W 60/00* (2013.01); *H04W 68/00* (2013.01); *H04W 76/06* (2013.01); *H04W 88/16* (2013.01); *H04W 92/24* (2013.01)

(58) Field of Classification Search
CPC ........... H04W 4/02; H04W 8/12; H04W 8/16; H04W 28/04; H04W 36/32; H04W 60/00; H04W 68/00; H04W 76/00; H04W 76/06; H04W 88/16; H04W 8/30; H04W 92/24
USPC ......... 370/252, 311, 328–329, 331–332, 392, 370/400–401; 455/435.1, 436, 450, 458
See application file for complete search history.

(56) References Cited

U.S. PATENT DOCUMENTS 6,937,862 B2     8/2005   Back et al.
2009/0270111 A1  10/2009  Nakamura et al.
(Continued)

FOREIGN PATENT DOCUMENTS

JP   2009-267706 A   11/2009
JP   2012-004846 A   1/2012
(Continued)

OTHER PUBLICATIONS

Korean Office Action with English Translation issued in KR 10-2013-7017696 mailed Feb. 5, 2015; 8 pages.
(Continued)

*Primary Examiner* — Charles C Jiang
*Assistant Examiner* — Mohamed Kamara
(74) *Attorney, Agent, or Firm* — Foley & Lardner LLP (57) ABSTRACT

A mobile communication method according to the present invention includes the steps of: starting, by a UE, re-attach processing for MME#2, upon receiving "Paging"; transmitting, by MME#1, "DDN Ack" including the IMSI of the UE, which is included in the "DDN", and "Cause=Re-Attach Success", to S-GW#1 specified by S-GW address #1 included in the "DDN"; and releasing, by S-GW#1, a PDN connection #1 between S-GW#1 and P-GW#1, upon receiving the "DDN Ack", the PDN connection #1 corresponding to the IMSI of the UE included in the "DDN Ack".

8 Claims, 7 Drawing Sheets

(51) Int. Cl.
*H04W 60/00* (2009.01)
*H04W 68/00* (2009.01)
*H04W 76/06* (2009.01)
*H04W 88/16* (2009.01)
*H04W 92/24* (2009.01)

(56) References Cited

U.S. PATENT DOCUMENTS

| | | |
|---|---|---|
| 2009/0318147 A1 | 12/2009 | Zhang et al. |
| 2010/0203906 A1* | 8/2010 | Fang et al. .................... 455/458 |
| 2010/0278108 A1* | 11/2010 | Cho et al. ...................... 370/328 |
| 2011/0075675 A1* | 3/2011 | Koodli et al. ................. 370/401 |
| 2011/0090848 A1* | 4/2011 | Kim et al. ..................... 370/328 |
| 2013/0148594 A1 | 6/2013 | Nishida et al. |

FOREIGN PATENT DOCUMENTS

| | | |
|---|---|---|
| KZ | 20453 A | 12/2008 |
| RU | 2297101 | 4/2007 |

OTHER PUBLICATIONS

V. Srinivasa Rao, "Signaling Procedures in LTE", Published in web-buyersguide.com, Mar. 12, 2010, 15 pages.

3GPP TSG CT4 Meeting #49bis, Jun. 29-Jul. 2, 2010, "Introduction of the DLDTA (Down Link Data Triggered Attach) function", C4-101741 (5 pgs.).

3GPP TSG CT4 Meeting #51bis, Jan. 24-28, 2011, "Pseudo-CR on Avoiding multiple reattachments to EPC", C4-110056 (6 pgs.).

3GPP TSG CT4 Meeting #51bis, Jan. 24-28, 2011, "Pseudo-CR on Avoid IMSI page after successful re-attach", C4-110118 (5 pgs.).

3GPP TR 23.857, V 0.2.0 (Nov. 2010), $3^{rd}$ Generation Partnership Project, Technical Specification Group Core Network and Terminals; Study of EPC Nodes Restoration, Release 10 (24 pgs.).

Extended European Search Report mailed May 23, 2014 in related European Application No. 14154202.7 (6 pgs.).

International Search Report with English translation; PCT/US2011/080445; Feb. 7, 2012; 5 pages.

"Study of EPC Nodes Restoration; (Release 10)"; 3GPP TR 23.857 V1.1.0, Feb. 2011; 30 pages.

NEC, "EPC node failure"; 3GPP TSG CT4 Meeting #49, C4-101116; Kyoto, Japan; May 2010;8 pages.

NTT DOCOMO, "New cause of DON ack for MME restart and restoration procedure", 3GPP TSG,CT4 Meeting #52, C4-110529; Salt Lake City, US; Feb. 2011; 6 pages.

Decision on Grant dated Oct. 23, 2014 in related Russian application No. 2013136833 with English-language translation (11 pgs.).

* cited by examiner

MOBILE COMMUNICATION METHOD, MOBILE MANAGEMENT NODE, AND SERVING GATEWAY APPARATUS

This application is the National Phase of PCT/JP2011/080445, filed Dec. 28, 2011, which claims priority to Japanese Application Nos. 2011-002554, filed Jan. 7, 2011, and 2011-085415, filed Apr. 7, 2011, the disclosures of which are hereby incorporated by reference in their entirety.

TECHNICAL FIELD

The present invention relates to a mobile communication method, a mobile management node, and a serving gateway apparatus.

BACKGROUND ART

In a mobile communication system of an EPS (Evolved Packet System) type specified in 3GPP, there is proposed an operation to be carried out when a P-GW (Packet Data Network-Gateway, packet data network gateway apparatus) #1 receives user data whose destination is a UE (User Equipment) in an idle state under control of an MME (Mobility Management Entity, mobile management node) #1, after the MME#1 which has been suspended due to a failure or the like is restarted.

The operation will be described below with reference to FIG. 7.

Figure 7:
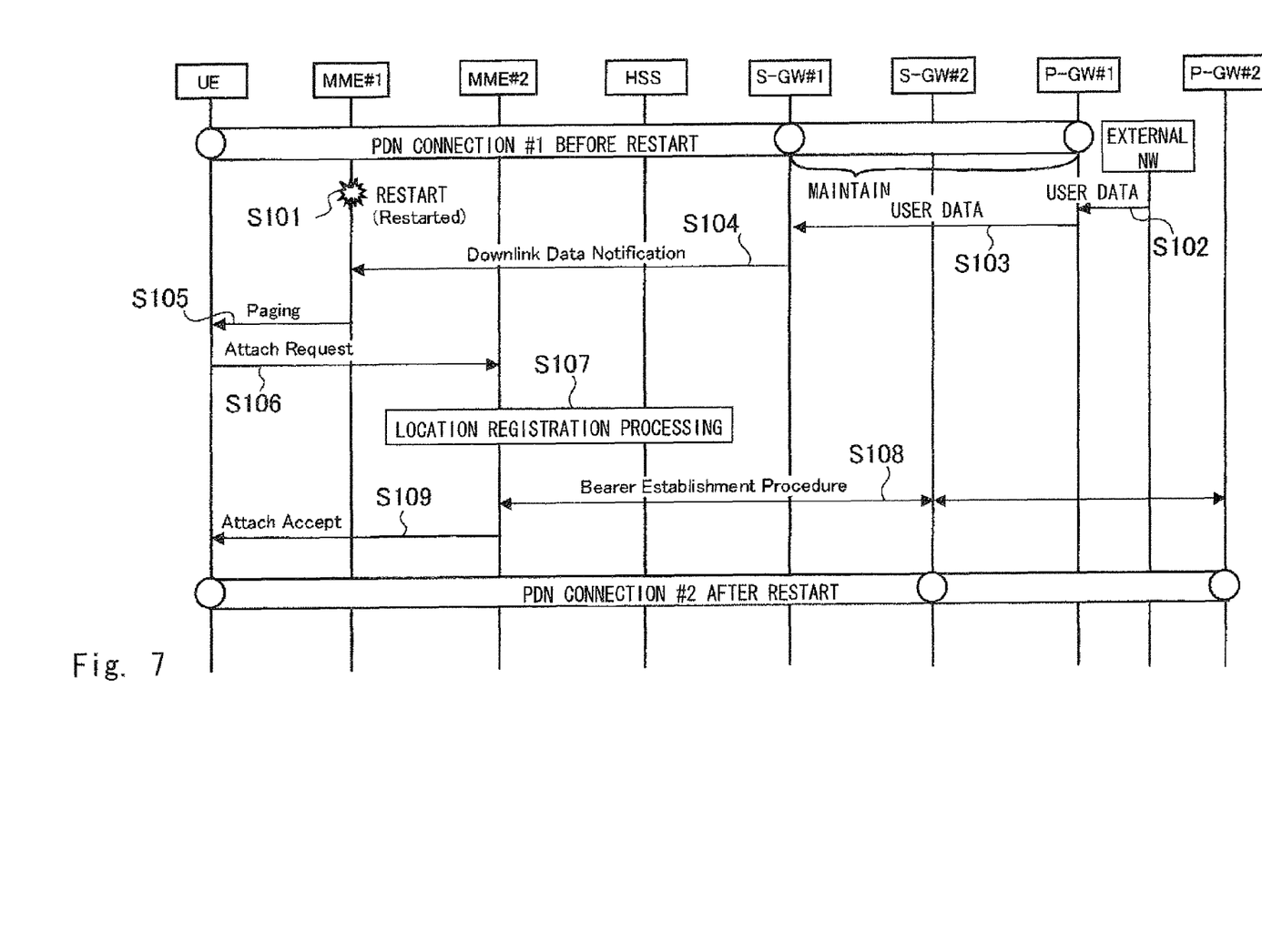
FIG. 7 is a sequence diagram illustrating operation of a mobile communication system of a related art.

As shown in FIG. 7, when the MME#1 is restarted in step S101 in a state (first state) in which a PDN connection #1 including one or more EPS bearers #1 is set among the UE, an S-GW (Serving Gateway, serving gateway apparatus) #1, and the P-GW#1, the state transitions to a state (second state) in which the PDN connection #1 is released between the UE and the S-GW#1 and the PDN connection #1 is maintained only between the S-GW#1 and the P-GW#1.

In step S102, upon receiving user data whose destination is the UE from an external network, the P-GW#1 transmits the user data whose destination is the UE to the S-GW#1 in step S103.

In step S104, the S-GW#1 transmits "DDN (Downlink Data Notification, downlink notification signal)" to the MME#1, because the PDN connection #1 is released between the UE and the S-GW#1.

In step S105, upon receiving the "DDN", the MME#1 transmits "Paging" whose destination is the UE specified by "IMSI (International Mobile Subscriber Identity)" included in the "DDN".

In step S106, upon receiving the "Paging" whose destination is the UE, the UE transmits "Attach Request (attach request signal)" to a core network so as to start re-attach processing. The "Attach Request" is transferred to an MME#2 via a radio access network.

In step S107, the MME#2 performs location registration processing for the UE with an HSS (Home Subscriber Server, subscriber information server apparatus).

In step S108, a PDN connection #2 including one or more EPS bearers #2 is set among the UE, an S-GW#2, and a P-GW#2.

In step S109, the MME#2 transmits "Attach Accept" to the UE.

CITATION LIST

Non Patent Literature

[Non Patent Literature 1] 3GPP TR23.857

SUMMARY OF INVENTION

Technical Problem

However, the applicant of the present invention has found that the operation causes the following problem.

That is, there is a problem that in the above-mentioned operation, the setting of the PDN connection #1 between the S-GW#1 and the P-GW#1 is maintained even after the PDN connection #2 is set, which results in a waste of resources.

Accordingly, the present invention has been made in view of the above-mentioned problem, and an object of the present invention is to provide a mobile communication method, a mobile management node, and a serving gateway apparatus which are capable of appropriately releasing the PDN connection #1 when the user data whose destination is the UE in the idle state under control of the MME#1 is received after the MME#1 which has been suspended due to a failure or the like is restarted.

Solution to Problem

A first exemplary aspect of the present invention is a mobile communication method in a mobile communication system in which when a first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile communication method including the steps of: transmitting, by the first serving gateway apparatus, a downlink data notification signal including identification information of the mobile station, an address of the first serving gateway apparatus, and identification information of the bearer, to the first mobile management node, upon receiving user data whose destination is the mobile station through the bearer in the second state; transmitting, by the first mobile management node, a paging signal whose destination is the mobile station, upon receiving the downlink data notification signal; starting, by the mobile station, re-attach processing for a second mobile management node, upon receiving the paging signal; transmitting, by the first mobile management node, a response signal for the downlink data notification signal including the identification information of the bearer, which is included in the downlink data notification signal, and information indicating that the re-attach processing is successful, to the first serving gateway apparatus specified by the address included in the downlink data notification signal; and releasing, by the first serving gateway apparatus, the connection between the first serving gateway apparatus and the first packet data network gateway apparatus, upon receiving the response signal, the connection corresponding to the identification information of the bearer included in the response signal.

A second exemplary aspect of the present invention is a mobile management node that operates as a first mobile management node in a mobile communication system in which when the first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile management node being configured to: receive a downlink data notification signal including identification information of the mobile station, an address of the first serving gateway apparatus, and identification information of the bearer, from the first serving gateway apparatus in the second state; transmit a paging signal whose destination is the mobile station, upon receiving the downlink data notification signal; and transmit a response signal for the downlink data notification signal including the identification information of the bearer, which is included in the downlink data notification signal, and information indicating whether re-attach processing is successful or not, to the first serving gateway apparatus specified by the address included in the downlink data notification signal, after the re-attach processing for a second mobile management node of the mobile station is started.

A third exemplary aspect of the present invention is a serving gateway apparatus that operates as a first serving gateway apparatus in a mobile communication system in which when a first mobile management node is restarted in a first state in which a connection including one or more bearers is set among a mobile station, the first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the serving gateway apparatus being configured to transmit a downlink data notification signal including identification information of the mobile station, an address of the first serving gateway apparatus, and identification information of the bearer, to the first mobile management node, upon receiving user data whose destination is the mobile station through the bearer in the second state; and release the connection between the serving gateway apparatus and the first packet data network gateway apparatus, upon receiving, from the first mobile management node, a response signal for the downlink data notification signal including information indicating that the re-attach processing is successful, the connection corresponding to the identification information of the bearer included in the response signal.

A fourth exemplary aspect of the present invention is a mobile communication method in a mobile communication system in which when a first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile communication method including the steps of: transmitting, by the first serving gateway apparatus, a downlink data notification signal including identification information of the mobile station, an address of the first serving gateway apparatus, and identification information of the bearer, to the first mobile management node, upon receiving user data whose destination is the mobile station through the bearer in the second state; transmitting, by the first mobile management node, a paging signal whose destination is the mobile station, upon receiving the downlink data notification signal; starting, by the mobile station, re-attach processing for a second mobile management node, upon receiving the paging signal; transmitting, by the first mobile management node, a connection deletion request signal including the identification information of the bearer, which is included in the downlink data notification signal, to the first serving gateway apparatus specified by the address included in the downlink data notification signal, upon receiving a positional information deletion request signal for requesting deletion of positional information of the mobile station; and releasing, by the first serving gateway apparatus, the connection between the first serving gateway apparatus and the first packet data network gateway apparatus, upon receiving the connection deletion request signal, the connection corresponding to the identification information of the bearer included in the connection deletion request signal.

A fifth exemplary aspect of the present invention is a mobile management node that operates as a first mobile management node in a mobile communication system in which when the first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile management node being configured to: receive a downlink data notification signal including identification information of the mobile station, an address of the first serving gateway apparatus, and identification information of the bearer, from the first serving gateway apparatus in the second state; transmit a paging signal whose destination is the mobile station, upon receiving the downlink data notification signal; and transmit a connection deletion request signal including the identification information of the bearer, which is included in the downlink data notification signal, to the first serving gateway apparatus specified by the address included in the downlink data notification signal, upon receiving a positional information deletion request signal for requesting deletion of positional information of the mobile station.

A sixth exemplary aspect of the present invention is a serving gateway apparatus that operates as a first serving gateway apparatus in a mobile communication system in which when a first mobile management node is restarted in a first state in which a connection including one or more bearers is set among a mobile station, the first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the serving gateway apparatus being configured to: transmit a downlink data notification signal including identification information of the mobile station, an address of the first serving gateway apparatus, and identification information of the bearer, to the first mobile management node, upon receiving user data whose destination is the mobile station through the bearer in the second state; and release the connection between the serving gateway apparatus and the first packet data network gateway apparatus, upon receiving a connection deletion request signal including the identification information of the bearer, which is included in the downlink data notification signal, the connection corresponding to the identification information of the bearer included in the connection deletion request signal.

A seventh exemplary aspect of the present invention is a mobile communication method in a mobile communication system in which when a first mobile management node is restarted in a first state in which a connection including one or more bearers is set among a mobile station, a serving gateway apparatus, and a packet data network gateway apparatus, the first state transitions to a second state in which the connection is released between the mobile station and the serving gateway apparatus and the connection is maintained only between the serving gateway apparatus and the packet data network gateway apparatus, the mobile communication method including the steps of: transmitting, by the serving gateway apparatus, a downlink data notification signal including identification information of the mobile station, to the mobile management node, upon receiving user data whose destination is the mobile station through the bearer in the second state; transmitting, by the mobile management node, a signal including the identification information of the mobile station and information indicating execution of re-attach processing or paging processing, to the serving gateway apparatus which is a source of the downlink data notification signal, upon receiving the downlink data notification signal, even when the re-attach processing for the mobile station is not completed; and releasing, by the serving gateway apparatus, the connection between the serving gateway apparatus and the packet data network gateway apparatus, upon receiving the signal, the connection corresponding to the identification information of the mobile station included in the signal.

An eighth exemplary aspect of the present invention is a mobile management node for use in a mobile communication system in which when the mobile management node is restarted in a first state in which a connection including one or more bearers is set among a mobile station, a serving gateway apparatus, and a packet data network gateway apparatus, the first state transitions to a second state in which the connection is released between the mobile station and the serving gateway apparatus and the connection is maintained only between the serving gateway apparatus and the packet data network gateway apparatus, the mobile management node being configured to: receive a downlink data notification signal including identification information of the mobile station from the serving gateway apparatus in the second state; and transmit a signal including the identification information of the mobile station and information indicating execution of re-attach processing or paging processing, to the serving gateway apparatus which is a source of the downlink data notification signal, upon receiving the downlink data notification signal, even when the re-attach processing for the mobile station is not completed.

Advantageous Effects of Invention

As described above, according to the present invention, it is possible to provide a mobile communication method, a mobile management node, and a serving gateway apparatus which are capable of appropriately releasing the PDN connection #1 when the user data whose destination is the UE in the idle state under control of the MME#1 is received after the MME#1 which has been suspended due to a failure or the like is restarted.

DESCRIPTION OF EMBODIMENTS (Mobile Communication System According to a First Exemplary Embodiment of the Present Invention)

Figure 1:
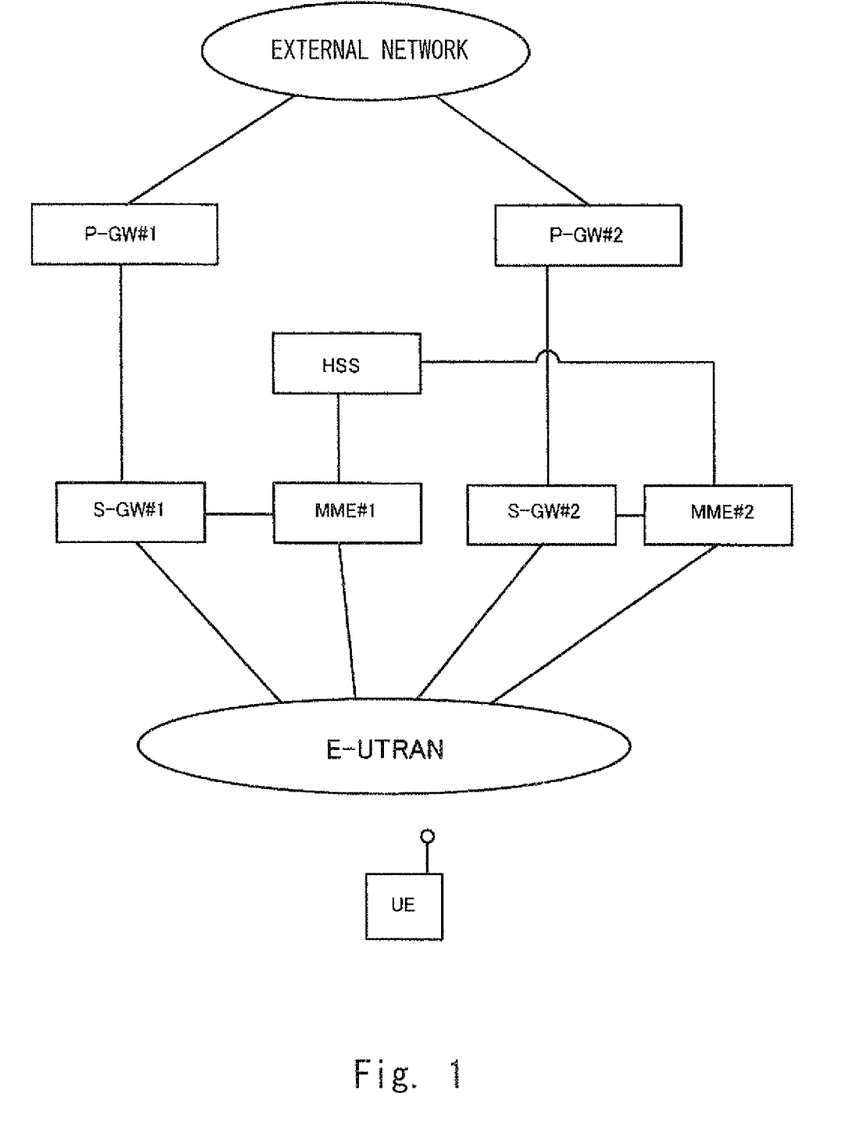
FIG. 1 is an overall configuration diagram of a mobile communication system according to a first exemplary embodiment of the present invention.
Figure 2:
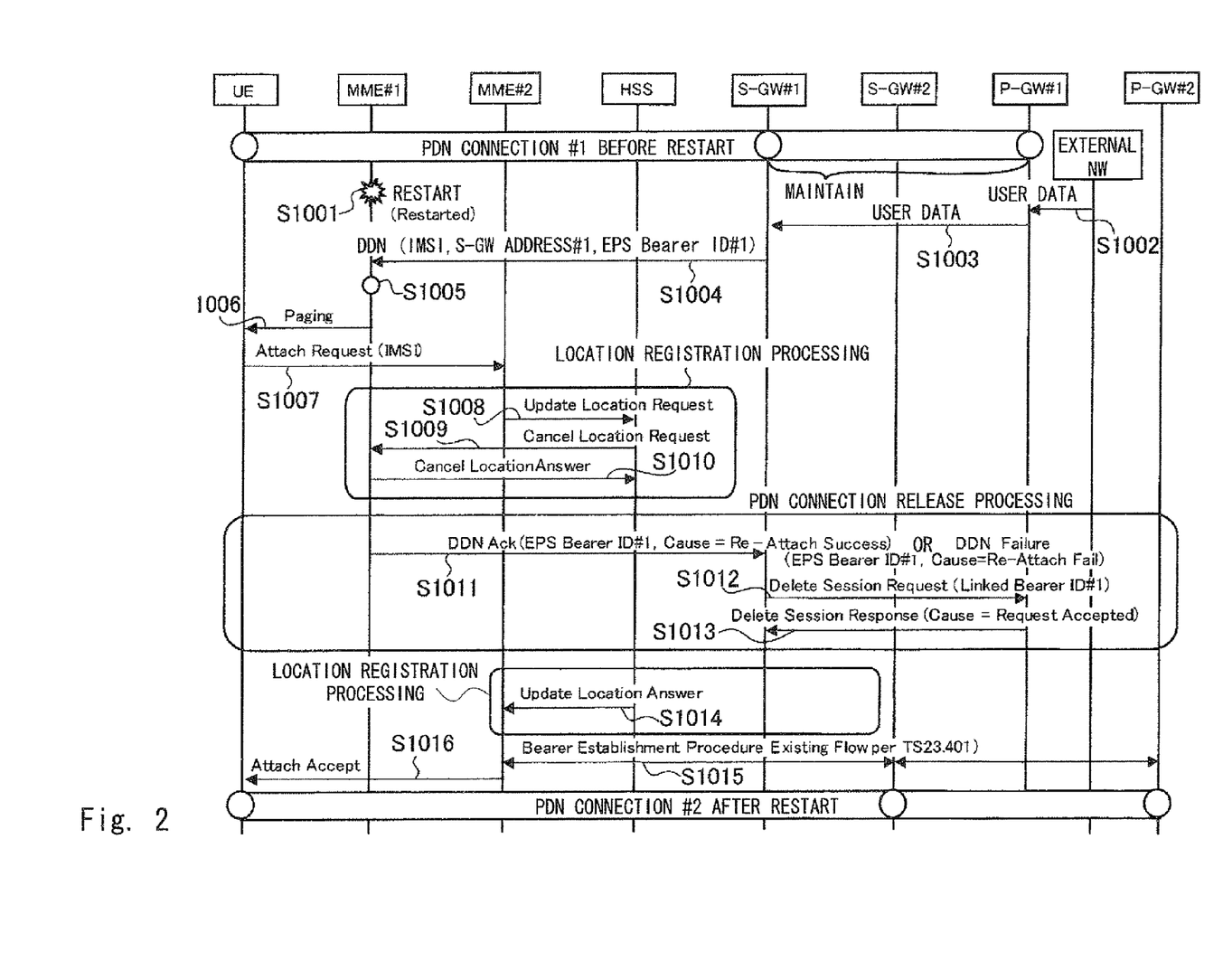
FIG. 2 is a sequence diagram illustrating operation of the mobile communication system according to the first exemplary embodiment of the present invention.

Referring to FIGS. 1 and 2, a mobile communication system according to the first exemplary embodiment of the present invention will be described.

As shown in FIG. 1, the mobile communication system according to this exemplary embodiment includes a P-GW#1, a P-GW#2, an S-GW#1, an S-GW#2, an MME#1, an MME#2, an E-UTRAN (Evolved Universal Terrestrial Radio Access Network), and an HSS.

Hereinafter, referring to FIG. 2, description will be made of operation to be carried out when the P-GW#1 receives user data whose destination is a UE in an idle state under control of the MME#1, after the MME#1 which has been suspended due to a failure or the like is restarted in the mobile communication system according to this exemplary embodiment.

As shown in FIG. 2, when the MME#1 is restarted in step S1001 in a state (first state) in which a PDN connection #1 including one or more EPS bearers #1 is set among the UE, the S-GW#1, and the P-GW#1, the state transitions to a state (second state) in which the PDN connection #1 is released between the UE and the S-GW#1 and the PDN connection #1 is maintained only between the S-GW#1 and the P-GW#1.

Note that in this case, the S-GW#1 may be set such that only a specific EPS bearer in the PDN connection #1 is not released between the S-GW#1 and the P-GW#1.

The EPS bearer may be set the necessity of releasing the EPS bearer in the S-GW#1 by use of QCI (QoS Class Identifier), a priority type "ARP (Allocation Retention Priority)", or the like.

Upon receiving user data whose destination is the UE from an external network in step S1002, the P-GW#1 transmits the user data whose destination is the UE to the S-GW#1 through an EPS bearer #1 in step S1003.

In step S1004, the S-GW#1 transmits the "DDN" including an IMSI of the UE, an S-GW address #1, which is an address of the S-GW#1, and "EPS Bearer ID#1", which is identification information of the EPS bearer #1, to the MME#1, because the PDN connection #1 is released between the UE and the S-GW#1 (that is, because restart of the MME#1 is detected by a GTP echo signal or the like).

Note that the S-GW address #1, which is the address of the S-GW#1, may be set to a header portion of the DDN signal.

In step S1005, the MME#1 stores, in a manner associated with each other, the IMSI of the UE, the S-GW address #1 included in the "DDN", and the "EPS Bearer ID#1" included in the "DDN".

In step S1006, upon receiving the "DDN" in which the IMSI is set, the MME#1 transmits "Paging" whose destination is the UE specified by the "IMSI" included in the "DDN".

When the MME#1 holds S-TMSI or the like, which is allocated to the UE before restart, in a memory, the "Paging" which is whose destination is the UE specified by the S-TMSI in place of the IMSI may be transmitted.

In this case, prior to execution of step S1007, the UE transmits "Service Request" to the MME#1, and the MME#1 notifies the UE of a reject signal, thereby activating step S1007 which is described later.

In step S1007, upon receiving the "Paging" whose destination is the UE, the UE transmits the "Attach Request" including the IMSI of the UE to a core network so as to start re-attach processing. The "Attach Request" is transferred to the MME#2 via a radio access network.

In step S1008, the MME#2 transmits "Update Location Request" to the HSS so as to start location registration processing for the UE.

In step S1009, the HSS transmits "Cancel Location Request (positional information deletion request signal)" to the MME#1.

In step S1010, the MME#1 transmits "Cancel Location Answer" to the HSS. Here, the MME#1 may notify the HSS of restart of the MME#1.

Upon receiving the notification, the HSS may be configured to store an MME error state in a profile held for other UEs accommodated in the MME#1, and to execute error processing in an inquiry from another device as to the presence in a service area.

Further, when the MME#1 holds context information (information on the UE), such as the S-TMSI or the like, which is allocated to the UE before restart, in the memory, the context information may be deleted.

When the re-attach processing for the MME#2 of the UE is successful, in step S1011, the MME#1 transmits "DDN Ack", which includes the "EPS Bearer ID#1" associated with the IMSI of the UE and "Cause=Re-Attach Success (information indicating that the re-attach processing is successful)", to the S-GW#1 specified by the S-GW address #1 which is associated with the IMSI of the UE.

On the other hand, when the re-attach processing for the MME#2 of the UE is unsuccessful, in step S1011, "DDN Failure", which includes the "EPS Bearer ID#1" associated with the IMSI of the UE and "Cause=Re-Attach Fail (information indicating that the re-attach processing is unsuccessful)", may be transmitted to the S-GW#1 specified by the S-GW address #1 which is associated with the IMSI of the UE. In this case, the S-GW#1 continuously holds the EPS bearer with the P-GW#1.

In step S1012, upon receiving the "DDN Ack" including the "Cause=Re-Attach Success (information indicating that the re-attach processing is successful)", the S-GW#1 transmits "Delete Session Request" including "Linked Bearer ID#1" corresponding to the "EPS Bearer ID#1" to the P-GW#1 so as to release the PDN connection #1 which is set between the S-GW#1 and the P-GW#1 and which corresponds to the "EPS Bearer ID#1".

The term "Linked Bearer ID#1" herein described refers to identification information for identifying the PDN connection #1.

In step S1013, after the PDN connection #1 is released, the P-GW#1 transmits "Delete Session Response" including "Cause=Request Accepted" to the S-GW#1. This processing allows the PDN connection #1 between the S-GW#1 and the P-GW#1 to be disconnected.

In step S1014, the HSS transmits "Update Location Answer" to the MME#2.

In step S1015, a PDN connection #2 including one or more EPS bearers #2 is set among the UE, the S-GW#2, and the P-GW#2.

In step S1016, the MME#2 transmits "Attach Accept" to the UE.

In the mobile communication system according to this exemplary embodiment, when the S-GW#1 receives the "DDN Ack" including the "Cause=Re-Attach Success (information indicating that the re-attach processing is successful)", the PDN connection #1 which is set between the S-GW#1 and the P-GW#1 and which corresponds to the "EPS Bearer ID#1" can be released.

Modified Example 1

Figure 3:
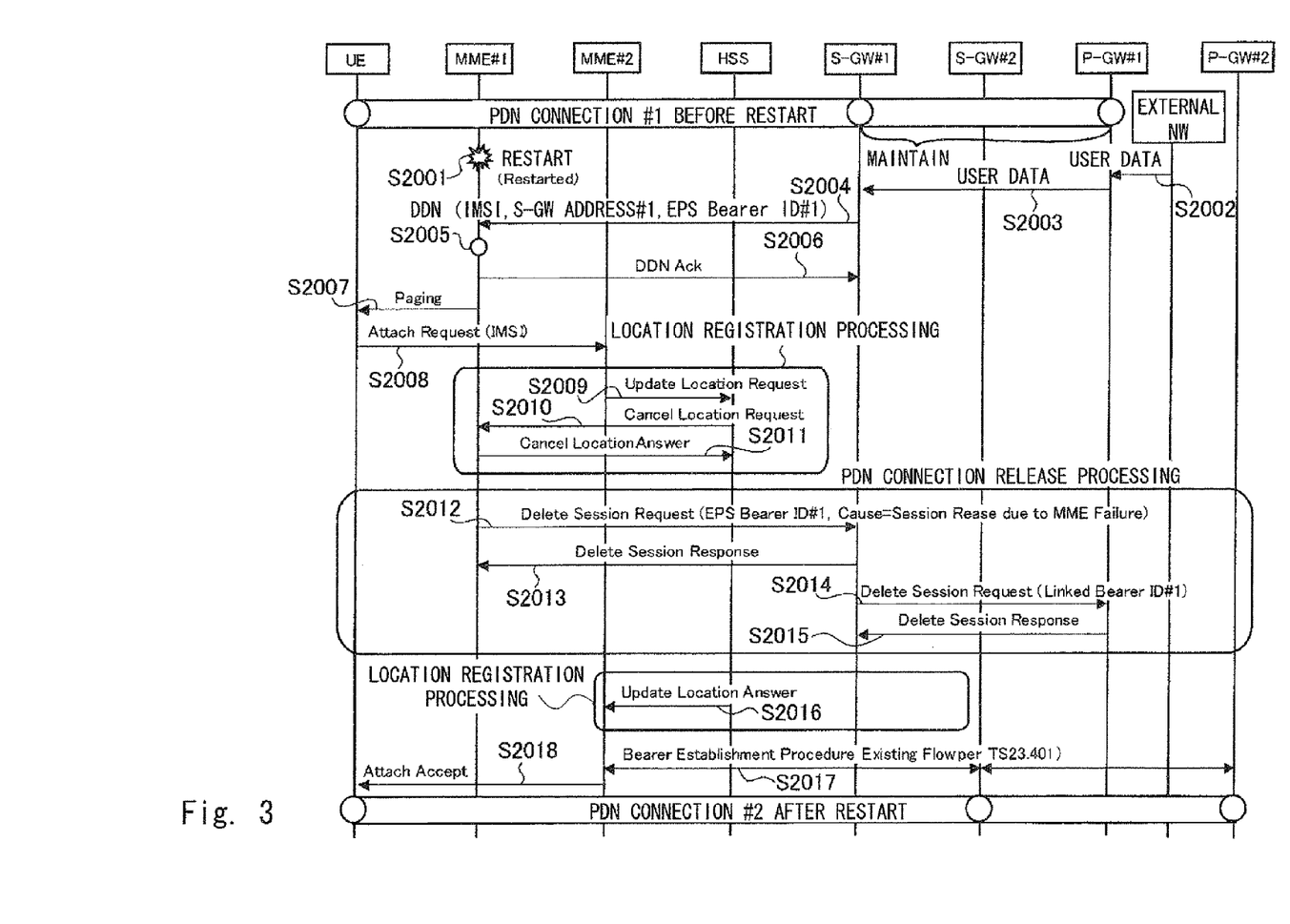
FIG. 3 is a sequence diagram illustrating operation of a mobile communication system according to Modified Example 1 of the present invention.

Referring to FIG. 3, a mobile communication system according to Modified Example 1 of the present invention will be described below while focusing on the differences from the mobile communication system according to the first exemplary embodiment described above.

Hereinafter, referring to FIG. 3, description will be made of operation to be carried out when the P-GW#1 receives user data whose destination is the UE in the idle state under control of the MME#1, after the MME#1 which has been suspended due to a failure or the like is restarted in the mobile communication system according to Modified Example 1 of the present invention.

As shown in FIG. 3, the operations in steps S2001 to S2005 are the same as the operations in steps S1001 to S1005 shown in FIG. 2.

In step S2006, the MME#1 transmits the "DDN Ack", which is a response signal for "DDN", to the S-GW#1. Note that the transmission of the "DDN Ack" may be omitted.

The operations in steps S2007 to S2011 are the same as the operations in steps S1006 to S1010 shown in FIG. 2.

In step S2012, the MME#1 transmits the "Delete Session Request (connection deletion request signal)" including the "EPS Bearer ID#1", which is associated with the IMSI of the UE, to the S-GW#1 specified by the S-GW address #1, which is associated with the IMSI of the UE, in response to the "Cancel Location Request" received in step S2010.

Here, the MME#1 may include, in the "Delete Session Request", "Cause=Session Release due to MME Failure" which is information indicating release of the PDN connection due to restart of the MME.

Further, the MME#1 may include the "EPS Bearer ID#1" in an existing information element within the "Delete Session Request", or may include the "EPS Bearer ID#1" in an information element newly set in the "Delete Session Request".

In step S2013, the S-GW#1 transmits the "Delete Session Response" to the MME#1.

In step S2014, upon receiving the "Delete Session Request", the S-GW#1 transmits the "Delete Session Request", which includes the "Linked Bearer ID#1" corresponding to the "EPS Bearer ID#1", to the P-GW#1 so as to release the PDN connection #1 which is set between the S-GW#1 and the P-GW#1 and which corresponds to the "EPS Bearer ID#1".

Here, the S-GW#1 may judge whether or not to execute the operation of step S2014 based on whether or not the "Delete Session Request" received from the MME#1 includes the "Cause=Session Release due to MME Failure".

In step S2015, the P-GW#1 transmits the "Delete Session Response" to the S-GW#1 after the PDN connection #1 is released.

The subsequent operations in steps S2016 to S2018 are the same as the operations in steps S1014 to S1016 shown in FIG. 2.

The mobile communication system according to Modified Example 1 is capable of releasing the PDN connection #1, which is set between the S-GW#1 and the P-GW#1 and corresponds to the "EPS Bearer ID#1", upon receiving the "Delete Session Request".

Note that the present invention is not limited to the above-described cases, but can also be applied to the case where the UE transmits the "Attach Request" to the restarted MME#1, upon receiving the "Paging" and executing the re-attach processing.

Specifically, in this case, the MME#1 stores information indicating the reception of the "DDN" in which the IMSI is set, and executes bearer release processing to the S-GW#1 at the timing when the "Update Location Answer" is received from the HSS.

Modified Example 2

Figure 4:
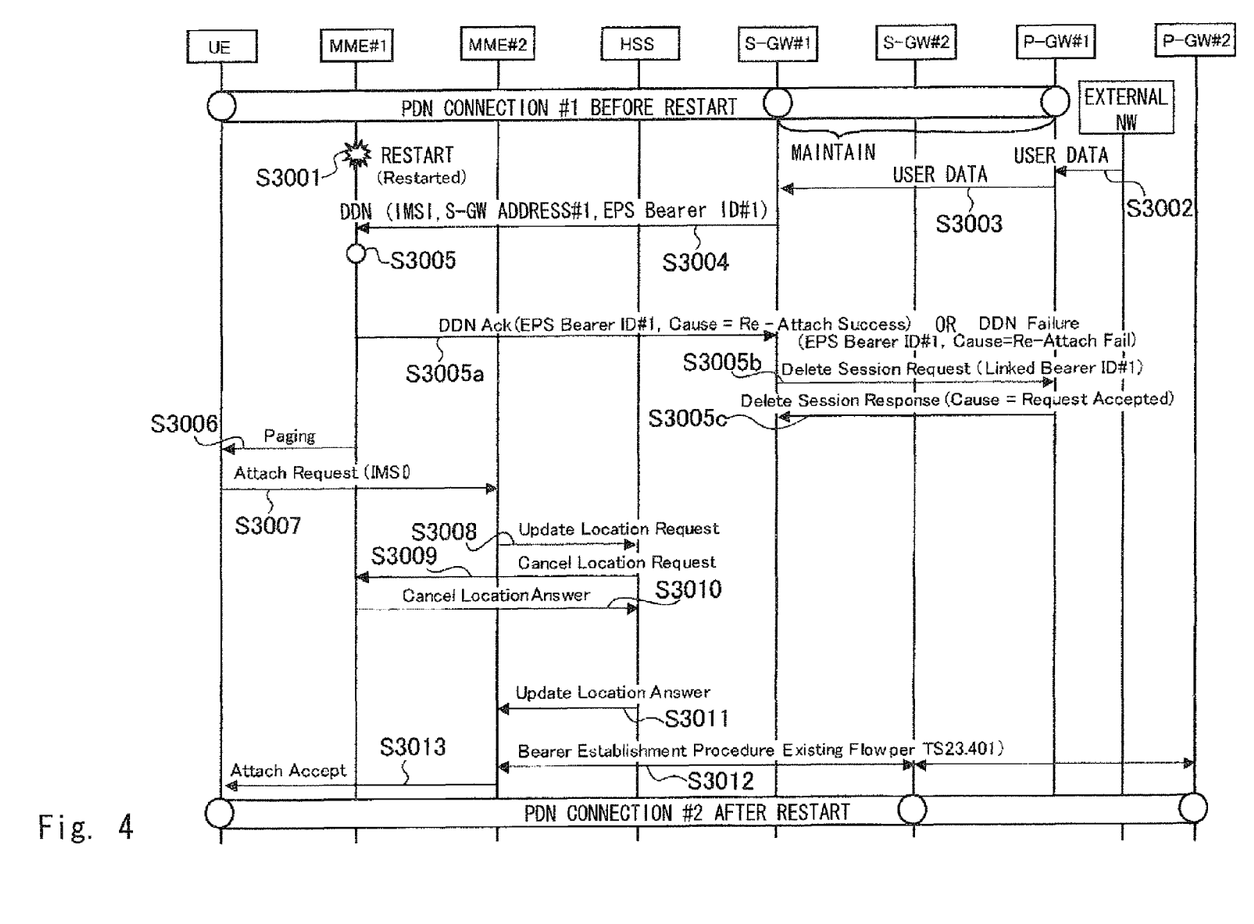
FIG. 4 is a sequence diagram illustrating operation of a mobile communication system according to Modified Example 2 of the present invention.

Referring to FIG. 4, a mobile communication system according to Modified Example 2 of the present invention will be described below while focusing on the differences from the mobile communication system according to the first exemplary embodiment described above.

Hereinafter, referring to FIG. 4, description will be made of operation to be carried out when the P-GW#1 receives user data whose destination is the UE in the idle state under control of the MME#1, after the MME#1 which has been suspended due to a failure or the like is restarted in the mobile communication system according to Modified Example 2.

As shown in FIG. 4, the operations in steps S3001 to S3005 are the same as the operations in steps S1001 to S1005 shown in FIG. 2.

Upon receiving the "DDN" in step S3005, the MME#1 transmits the "DDN Ack" including the IMSI of the UE and "Cause=Re-Attach Success" to the S-GW#1, which is a source of the "DDN", in step S3005a, even when the re-attach processing for the UE is not completed.

In the example of FIG. 4, upon receiving the "DDN" in step S3005, the MME#1 transmits, in step S3005a, the "DDN Ack" including the IMSI of the UE and "Cause=Re-Attach Success" to the S-GW#1, which is a source of the "DDN", prior to transmission of the "Paging" to the UE.

Here, the MME#1 may transmit "Cause=Paging Success (information indicating that the paging processing has been executed)" instead of the "Cause=Re-Attach Success".

In step S3005b, when receiving the "DDN Ack" including the "Cause=Re-Attach Success", the S-GW#1 transmits the "Delete Session Request" including the "Linked Bearer ID#1", which corresponds to the IMSI of the UE or the "EPS Bearer ID#1", to the P-GW#1 so as to release the PDN connection #1 which corresponds to the "EPS Bearer ID#1" and which is set between the S-GW#1 and the P-GW#1.

In step S3005c, after the PDN connection #1 is released, the P-GW#1 transmits the "Delete Session Response" including the "Cause=Request Accepted" to the S-GW#1. This processing allows the PDN connection #1 between the S-GW#1 and the P-GW#1 to be disconnected.

The subsequent operations in steps S3006 to S3013 are the same as the operations in steps S1006 to S1016 shown in FIG. 2.

Modified Example 3

Figure 5:
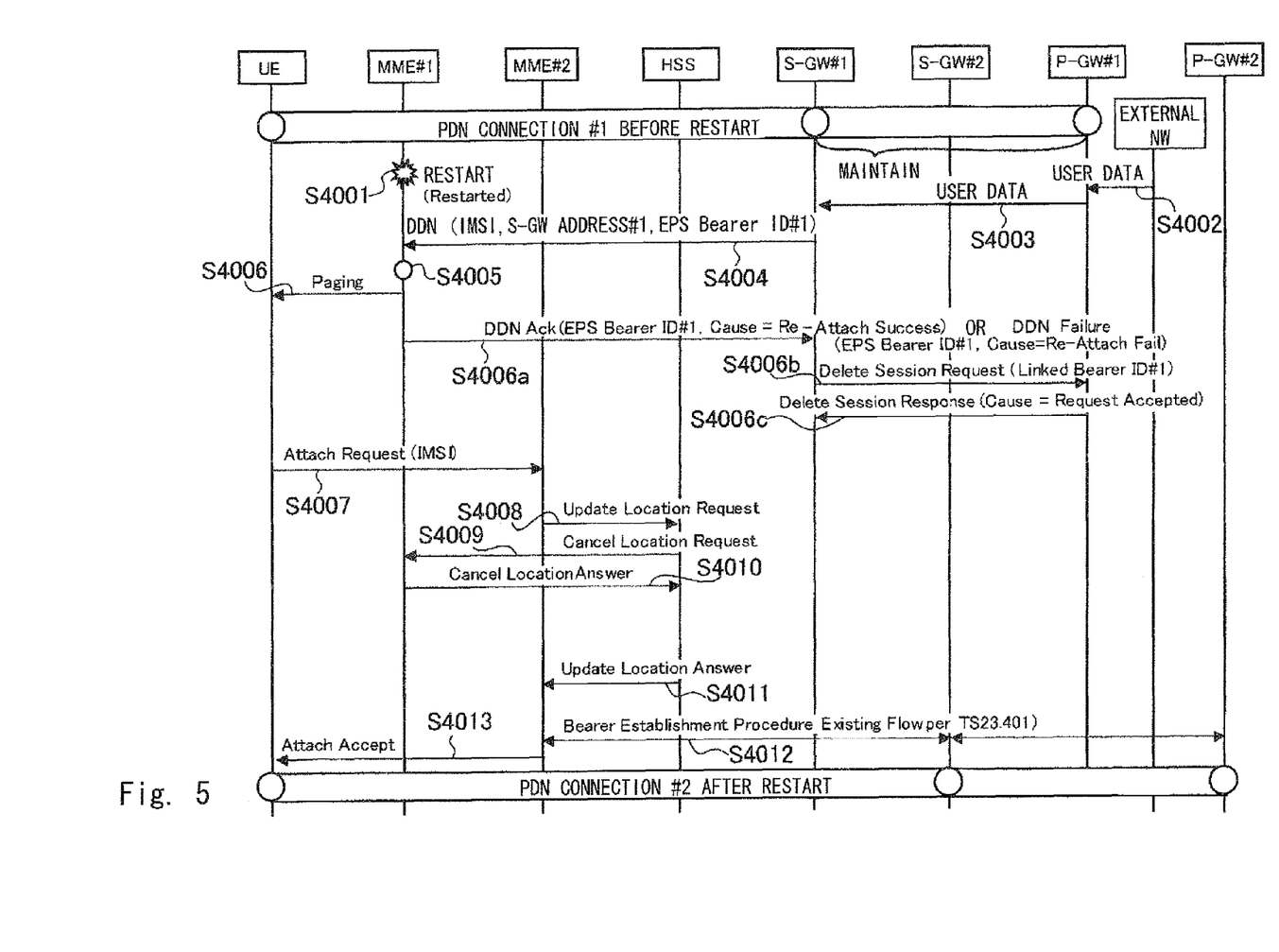
FIG. 5 is a sequence diagram illustrating operation of a mobile communication system according to Modified Example 3 of the present invention.

Referring to FIG. 5, a mobile communication system according to Modified Example 3 of the present invention will be described below while focusing on the differences from the mobile communication system according to the first exemplary embodiment described above.

Hereinafter, referring to FIG. 5, description will be made of operations to be carried out when the P-GW#1 receives user data whose destination is the UE in the idle state under control of the MME#1, after the MME#1 which has been suspended due to a failure or the like is restarted in the mobile communication system according to Modified Example 3.

As shown in FIG. 5, the operations in steps S4001 to S4006 are the same as the operations in steps S1001 to S1006 shown in FIG. 2.

Upon receiving the "DDN" in step S4005, the MME#1 transmits the "DDN Ack" including the IMSI of the UE and "Cause=Re-Attach Success" to the S-GW#1, which is a source of the "DDN", in step S4006a, even when the re-attach processing for the UE is not completed.

In the example of FIG. 5, when the "DDN" is received in step S4005, the "Paging" is transmitted to the UE in step S4006. After that, the "DDN Ack" including the IMSI of the UE and "Cause=Re-Attach Success" is transmitted to the S-GW#1, which is a source of the "DDN", in step S4006a, prior to reception of the "Cancel Location Request" from the HSS in step S4009.

Note that step S4006a may be executed after the reception of the "Cancel Location Request" from the HSS in step S4009.

In step S4006b, upon receiving the "DDN Ack" including the "Cause=Re-Attach Success", the S-GW#1 transmits the "Delete Session Request" including the "Linked Bearer ID#1", which corresponds to the IMSI of the UE or the "EPS Bearer ID#1", to the P-GW#1 so as to release the PDN connection #1 which corresponds to the "EPS Bearer ID#1" and which is set between the S-GW#1 and the P-GW#1.

In step S4006c, after the PDN connection #1 is released, the P-GW#1 transmits the "Delete Session Response" including the "Cause=Request Accepted" to the S-GW#1. This processing allows the PDN connection #1 between the S-GW#1 and the P-GW#1 to be disconnected.

The subsequent operations in steps S4007 to S4013 are the same as the operations in steps S1007 to S1016 shown in FIG. 2.

Modified Example 4

Figure 6:
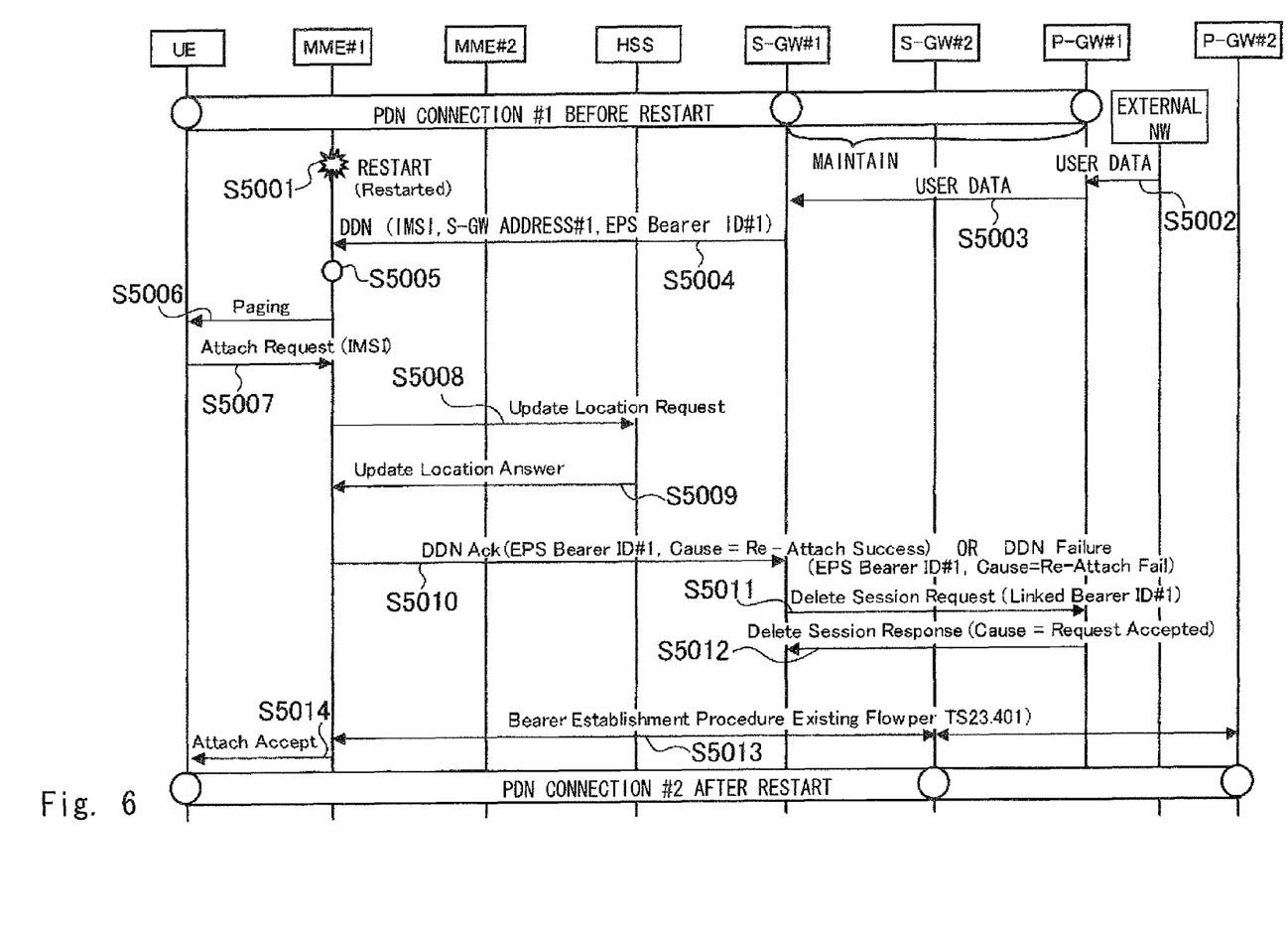
FIG. 6 is a sequence diagram illustrating operation of a mobile communication system according to Modified Example 4 of the present invention.

Referring to FIG. 6, a mobile communication system according to Modified Example 4 of the present invention will be described below while focusing on the differences from the mobile communication system according to the first exemplary embodiment described above.

Hereinafter, referring to FIG. 6, description will be made of operations to be carried out when the P-GW#1 receives user data whose destination is the UE in the idle state under control of the MME#1, after the MME#1 which has been suspended due to a failure or the like is restarted in the mobile communication system according to Modified Example 4.

As shown in FIG. 6, the operations in steps S5001 to S5006 are the same as the operations in steps S1001 to S1006 shown in FIG. 2.

In step S5007, upon receiving the "Paging" whose destination is the UE, the UE transmits the "Attach Request" including the IMSI of the UE to the MME#1 via the radio access network so as to start the re-attach processing.

In step S5008, the MME#1 transmits the "Update Location Request" to the HSS so as to start the location registration processing for the UE.

In step S5009, the HSS transmits the "Update Location Answer" to the MME#1.

When the re-attach processing for the MME#1 of the UE is successful, the MME#1 transmits, in step S5010, the "DDN Ack" including the IMSI of the UE and "Cause=Re-Attach Success" to the S-GW#1 which is a source of the "DDN".

Note that the MME#1 may transmit the "DDN Ack" to the S-GW#1 in step S5010, upon detecting the reception of the "Attach Request" in step S5007.

In step S5011, upon receiving the "DDN Ack" including the IMSI of the UE and "Cause=Re-Attach Success", the S-GW#1 transmits the "Delete Session Request" including the "Linked Bearer ID#1" corresponding to the "EPS Bearer ID#1", which corresponds to the IMSI of the UE, to the P-GW#1 so as to release the PDN connection #1 which corresponds to the "EPS Bearer ID#1" and which is set between the S-GW#1 and the P-GW#1.

In step S5012, after the PDN connection #1 is released, the P-GW#1 transmits the "Delete Session Response" including the "Cause=Request Accepted" to the S-GW#1. This processing allows the PDN connection #1 between the S-GW#1 and the P-GW#1 to be disconnected.

In step S5013, the PDN connection #2 including one or more EPS bearers #2 is set among the UE, the S-GW#2, and the P-GW#2.

In step S5014, the MME#1 transmits the "Attach Accept" to the UE.

The aspects of the above-described exemplary embodiments may be also expressed as follows.

A first exemplary aspect of this exemplary embodiment is a mobile communication method in a mobile communication system in which when the MME#1 (mobile management node) is restarted in the first state in which the PDN connection #1 (connection) including one or more EPS bearers #1 (bearer) is set among the UE (mobile station), the S-GW#1 (serving gateway apparatus), and the P-GW#1 (packet data network gateway apparatus), the first state transitions to the second state in which the PDN connection #1 is released between the UE and the S-GW#1 and the PDN connection #1 is maintained only between the S-GW#1 and the P-GW#1, the mobile communication method including the steps of: transmitting, by the S-GW#1, the "DDN (downlink data notification signal)" including the IMSI of the UE to the MME#1, upon receiving user data whose destination is the UE through the EPS Bearer #1 in the second state; transmitting, by the MME#1, the "Paging (Paging signal)" whose destination is the UE, upon receiving the "DDN"; starting, by the UE, re-attach processing for the MME#2 (second mobile management node), upon receiving the "Paging"; transmitting, by the MME#1, the "DDN Ack/DDN Failure (signal)" including the IMSI of the UE and "Cause=Re-Attach Success (information indicating that the mobile station has executed the re-attach processing)", which are included in the "DDN", to the S-GW#1 which is a source of the "DDN"; and releasing, by the S-GW#1, the PDN connection #1 between the S-GW#1 and the P-GW#1, upon receiving the "DDN Ack", the PDN connection #1 corresponding to the IMSI of the UE included in the "DDN Ack".

A second exemplary aspect of this exemplary embodiment is an MME that operates as the MME#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the MME being configured to: receive the "DDN" including the IMSI of the UE from the S-GW#1 in the second state; transmit "Paging" whose destination is the UE, upon receiving the "DDN"; and transmit the "DDN Ack/DDN Failure" including the IMSI of the UE included in the "DDN" and "Cause=Re-Attach Success" to the S-GW#1 which is a source of the "DDN", after the re-attach processing for the MME#2 of the UE is started.

A third exemplary aspect of this exemplary embodiment is an S-GW that operates as the S-GW#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the S-GW being configured to: transmit the "DDN" including the IMSI of the UE to the MME#1, upon receiving user data whose destination is the UE through the EPS bearer #1 in the second state; and release the PDN connection #1 between the S-GW and the P-GW#1, upon receiving the "DDN Ack/DDN Failure" including the IMSI of the UE and "Cause=Re-Attach Success" from the MME#1, the PDN connection #1 corresponding to the IMSI of the UE included in the "DDN Ack".

A fourth exemplary aspect of this exemplary embodiment is a mobile communication method in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the mobile communication method including the steps of: transmitting, by the S-GW#1, the "DDN" including the IMSI of the UE, S-GW address #1, and "EPS Bearer ID#1" to the MME#1, upon receiving user data whose destination is the UE through the EPS bearer #1 in the second state; transmitting, by the MME#1, the "Paging" whose destination is the UE, upon receiving the "DDN"; starting, by the UE, the re-attach processing for the MME#2, upon receiving the "Paging"; transmitting, by the MME#1, the "Delete Session Request (connection deletion request signal)" including the "EPS Bearer ID#1", which is included in the "DDN", to the S-GW#1 specified by the S-GW address #1 included in the "DDN", upon receiving the "Cancel Location Request (positional information deletion request signal for requesting deletion of positional information of the mobile station)"; and releasing, by the S-GW#1, the PDN connection #1 between the S-GW#1 and the P-GW#1, upon receiving the "Delete Session Request", the PDN connection #1 corresponding to the "EPS Bearer ID#1" included in the "Delete Session Request".

A fifth exemplary aspect of this exemplary embodiment is an MME that operates as the MME#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the MME being configured to: receive the "DDN" including the IMSI of the UE, S-GW address #1, and "EPS Bearer ID#1" from the S-GW#1 in the second state; transmit the "Paging" whose destination is the UE, upon receiving the "DDN"; and transmit the "Delete Session Request" including the "EPS Bearer ID#1", which is included in the "DDN", to the S-GW#1 specified by the S-GW address #1 included in the "DDN, upon receiving the "Cancel Location Request".

A sixth exemplary aspect of this exemplary embodiment is an S-GW that operates as the S-GW#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the S-GW being configured to: transmit the "DDN" including the IMSI of the UE, S-GW address #1, and "EPS Bearer ID#1" to the MME#1, upon receiving user data whose destination is the UE through the EPS bearer #1 in the second state; and release the PDN connection #1 between the S-GW and the P-GW#1, upon receiving the "Delete Session Request" including the "EPS Bearer ID#1", which is included in the "DDN", from the MME#1, the PDN connection #1 corresponding to the "EPS Bearer ID#1" included in the "Delete Session Request".

A seventh exemplary aspect of this exemplary embodiment is a mobile communication method in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the mobile communication method including the steps of: transmitting, by the S-GW#1, the "DDN" including the IMSI of the UE to the MME#1, upon receiving user data whose destination is the UE through the EPS bearer #1 in the second state; transmitting, by the MME#1, the "DDN Ack (response signal for the downlink data notification signal)" including the IMSI of the UE and "Cause=Re-Attach Success (information indicating that the mobile station UE has executed the re-attach processing)" to the S-GW#1 which is a source of the "DDN", upon receiving the "DDN", even when the re-attach processing for the UE is not completed; and releasing, by the S-GW#1, the PDN connection #1 between the S-GW#1 and the P-GW#1, upon receiving the "DDN Ack", the PDN connection #1 corresponding to the IMSI of the UE included in the "DDN Ack".

An eighth exemplary aspect of this exemplary embodiment is an MME for use in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the MME being configured to: receive the "DDN" including the IMSI of the UE from the S-GW#1 in the second state; and transmit the "DDN Ack" including the IMSI of the UE and "Cause=Re-Attach Success" to the S-GW#1 which is a source of the "DDN", upon receiving the "DDN", even when the re-attach processing for the UE is not completed.

Note that the above-described operations of the MME#1, MME#2, S-GW#1, S-GW#2, P-GW#1, P-GW#2, eNB#1, eNB#2, and UE may be implemented by hardware, a software module executed by a processor, or a combination thereof.

The software module may be provided in storage media of any form such as RAM (Random Access Memory), flash memory, ROM (Read Only Memory), EPROM (Erasable Programmable ROM), EEPROM (Electronically Erasable and Programmable ROM), register, hard disk, removable disk, or CD-ROM.

The storage media are connected to the processor so that the processor can read and write information from and to the storage media. The storage media may be integrated in the processor. The storage media and the processor may be provided in an ASIC. The ASIC may be provided in the MME#1, MME#2, S-GW#1, S-GW#2, P-GW#1, P-GW#2, eNB#1, eNB#2, and UE. The storage media and the processor may be provided, as discrete components, in the MME#1, MME#2, S-GW#1, S-GW#2, P-GW#1, P-GW#2, eNB#1, eNB#2, and UE.

Though the present invention has been described above in detail with reference to the above-described exemplary embodiments, it is apparent to those skilled in the art that the present invention is not limited to the exemplary embodiments herein described. The present invention can be implemented as modified and changed modes without departing from the gist and scope of the present invention as defined by the claims. Therefore, the description of the specification is intended for explaining the example only and does not impose any limited meaning to the present invention.

REFERENCE SIGNS LIST

UE MOBILE STATION
eNB RADIO BASE STATION
MME#1, MME#2 MOBILE MANAGEMENT NODE
S-GW#1, S-GW#2 SERVING GATEWAY APPARATUS
P-GW#1, P-GW#2 PDN GATEWAY APPARATUS
HSS SUBSCRIBER INFORMATION MANAGEMENT SERVER

The invention claimed is:

1. A mobile terminal for performing communication with a core network including a mobility management node and a SGW (Serving Gateway), the mobile terminal comprising:
a receiver that receives a paging by the mobility management node which releases, on reception of a DDN (Downlink Data Notification) from the SGW maintaining a bearer between the SGW and a PGW (Packet Data Network Gateway), the bearer by sending a DDN Acknowledge, which includes a cause that the mobile terminal has re-attached, to the SGW, wherein the DDN includes IMSI (International Mobile Subscriber Identity) to identify the mobile terminal; and
a transmitter that transmits an Attach Request to the core network to start a re-attach procedure upon receipt of the paging.

2. The mobile terminal according to claim 1, wherein
the transmitter transmits the Attach Request to said or another mobility management node in the core network.

3. The mobile terminal according to claim 1, wherein
the receiver receives the paging on the basis of the IMSI.

4. The mobile terminal according to claim 2, wherein
in a case where the receiver receives the paging on the basis of SAE (System Architecture Evolution) Temporary Mobile Station Identifier (S-TMSI) allocated to the mobile terminal, the transmitter transmits a Service Request to the mobility management node before transmitting the Attach Request.

5. A communication method of a mobile terminal that performs communication with a core network including a mobility management node and a SGW (Serving Gateway), the communication method comprising:
receiving a paging by the mobility management node which releases, upon reception of a DDN (Downlink Data Notification) from the SGW maintaining a bearer between the SGW and a PGW (Packet Data Network Gateway), the bearer by sending a DDN Acknowledge, which includes a cause that the mobile terminal has re-attached, to the SGW, wherein the DDN includes IMSI (International Mobile Subscriber Identity) to identify the mobile terminal; and transmitting an Attach Request to the core network to start a re-attach procedure upon receipt of the paging.

6. The communication method according to claim 5, wherein the mobile terminal transmits the Attach Request to said or another mobility management node in the core network.

7. The communication method according to claim 5, wherein the mobile terminal receives the paging on the basis of the IMSI.

8. The communication method according to claim 6, further comprising:

on receipt of the paging on the basis of SAE (System Architecture Evolution) Temporary Mobile Station Identifier (S-TMSI) allocated to the mobile terminal, transmitting a Service Request to the mobility management node before transmitting the Attach Request.

* * * * *